C. W. PARKER.
CLUTCH MECHANISM FOR TRANSMISSION GEARING.
APPLICATION FILED JUNE 7, 1911.

1,177,133.

Patented Mar. 28, 1916.
7 SHEETS—SHEET 1.

WITNESSES:
F. B. Graves
Lyman Andrews Jr.

INVENTOR
Clark W. Parker
BY
Chapin Wayman
his ATTORNEYS

C. W. PARKER.
CLUTCH MECHANISM FOR TRANSMISSION GEARING.
APPLICATION FILED JUNE 7, 1911.

1,177,133.

Patented Mar. 28, 1916.
7 SHEETS—SHEET 4.

WITNESSES:

INVENTOR

BY his ATTORNEYS

C. W. PARKER.
CLUTCH MECHANISM FOR TRANSMISSION GEARING.
APPLICATION FILED JUNE 7, 1911.
1,177,133.
Patented Mar. 28, 1916.
7 SHEETS—SHEET 5.
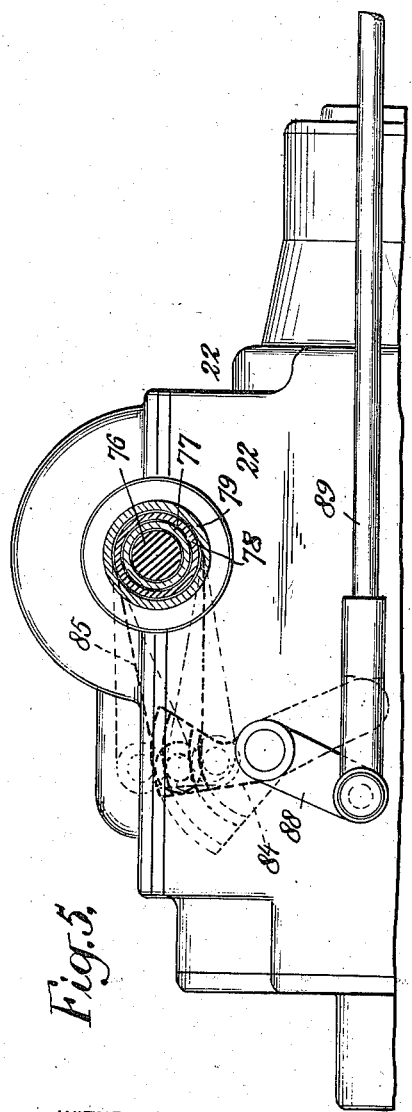
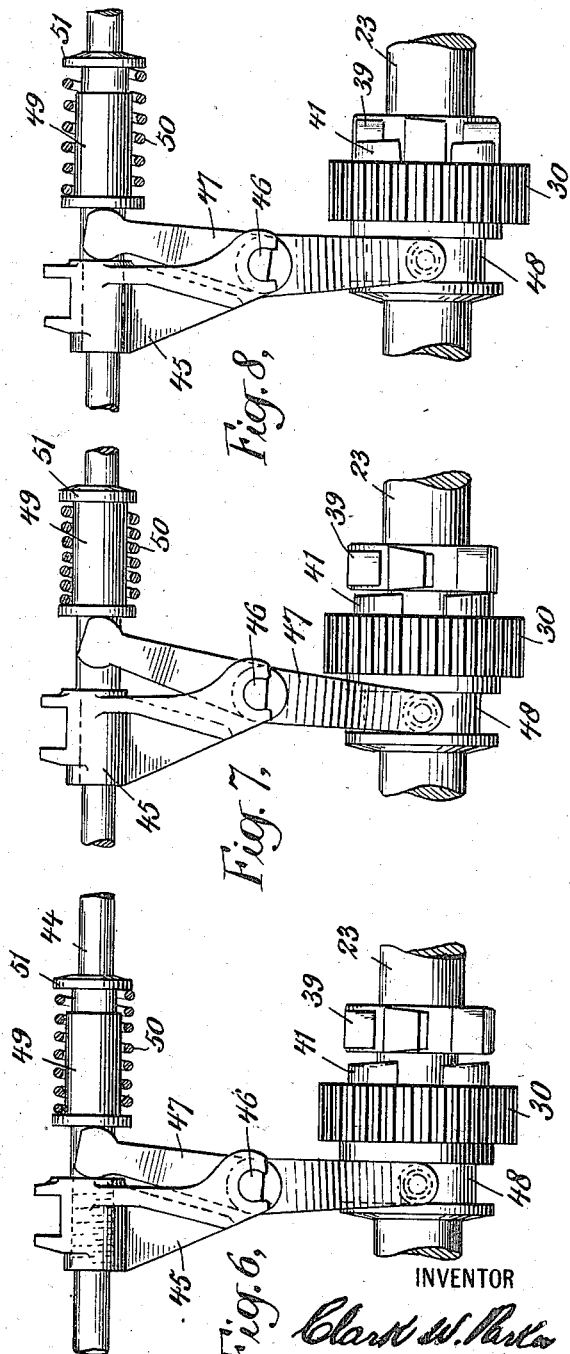
WITNESSES:
F. B. Graves
Lyman Andrews Jr.
INVENTOR
Clark W. Parker
BY
Chapin & Wayne
his ATTORNEYS

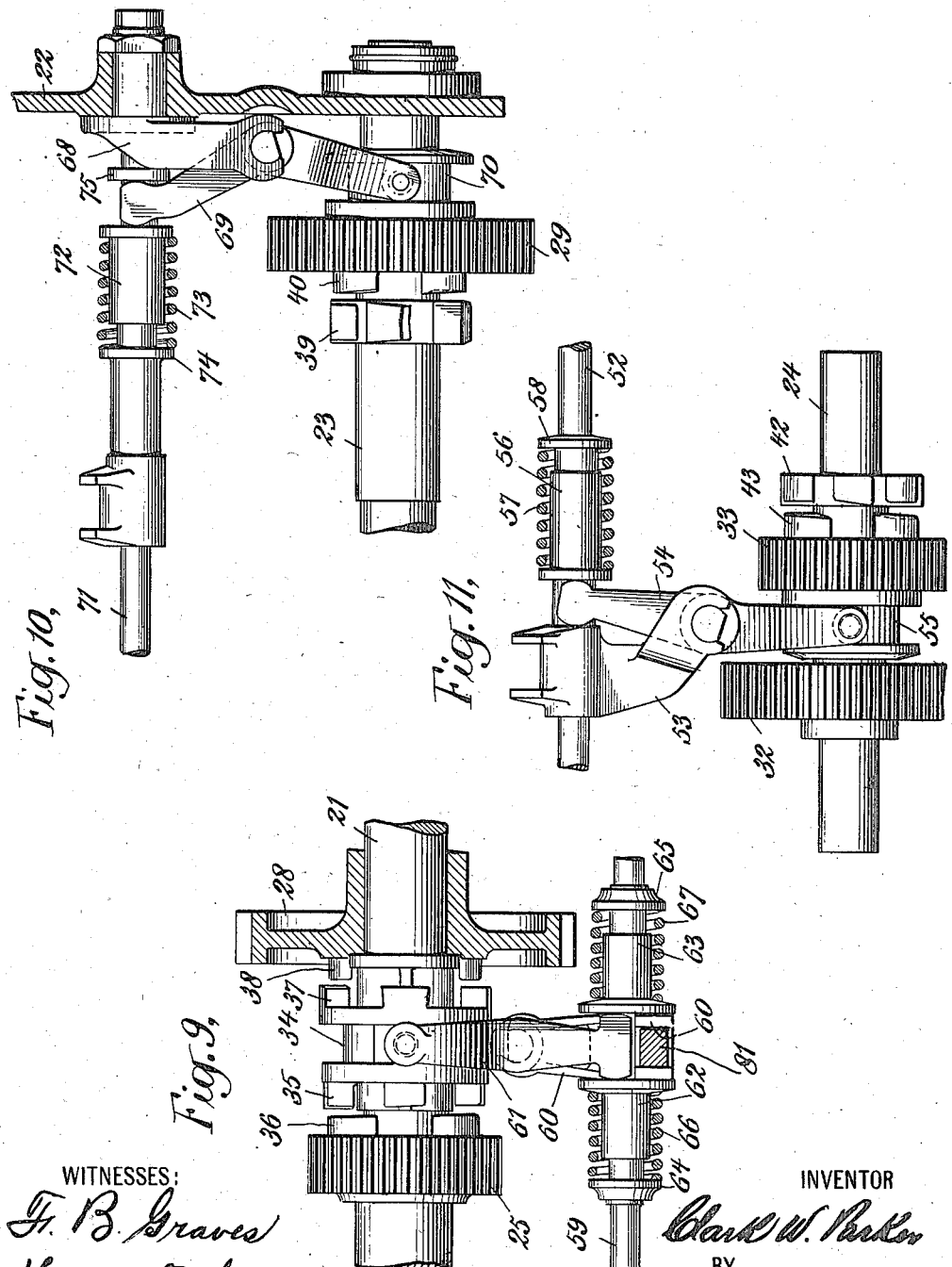

C. W. PARKER.
CLUTCH MECHANISM FOR TRANSMISSION GEARING.
APPLICATION FILED JUNE 7, 1911.

1,177,133.

Patented Mar. 28, 1916.
7 SHEETS—SHEET 7.

WITNESSES:
F. B. Graves
Lyman Andrews Jr.

INVENTOR
Clark W. Parker
BY
his ATTORNEYS

UNITED STATES PATENT OFFICE.

CLARK W. PARKER, OF SPRINGFIELD, MASSACHUSETTS, ASSIGNOR, BY MESNE ASSIGNMENTS, TO JAMES H. DUNN, OF SPRINGFIELD, MASSACHUSETTS.

CLUTCH MECHANISM FOR TRANSMISSION-GEARING.

1,177,133.  Specification of Letters Patent.  Patented Mar. 28, 1916.

Application filed June 7, 1911. Serial No. 631,688.

*To all whom it may concern:*

Be it known that I, CLARK W. PARKER, a citizen of the United States of America, and a resident of Springfield, county of Hampden, and State of Massachusetts, have invented certain new and useful Improvements in Clutch Mechanism for Transmission-Gearing, of which the following is a specification, reference being had to the accompanying drawings, forming a part thereof.

My invention relates to clutch mechanism for transmission gearing of the type employed to produce different speeds and in different directions which clutch mechanism is particularly applicable to some types of transmission gearing employed in motor vehicles.

My invention also consists in novel features of construction in relation to the clutch operating mechanism, and particularly in relation to yielding means employed between the clutch operating means and the clutch elements, all as will be fully pointed out hereinafter.

In order that my invention may be fully understood I will now proceed to describe a structure constituting an embodiment thereof, having reference to the accompanying drawings illustrating the same, and will then point out the novel features in claims.

Figure 1:
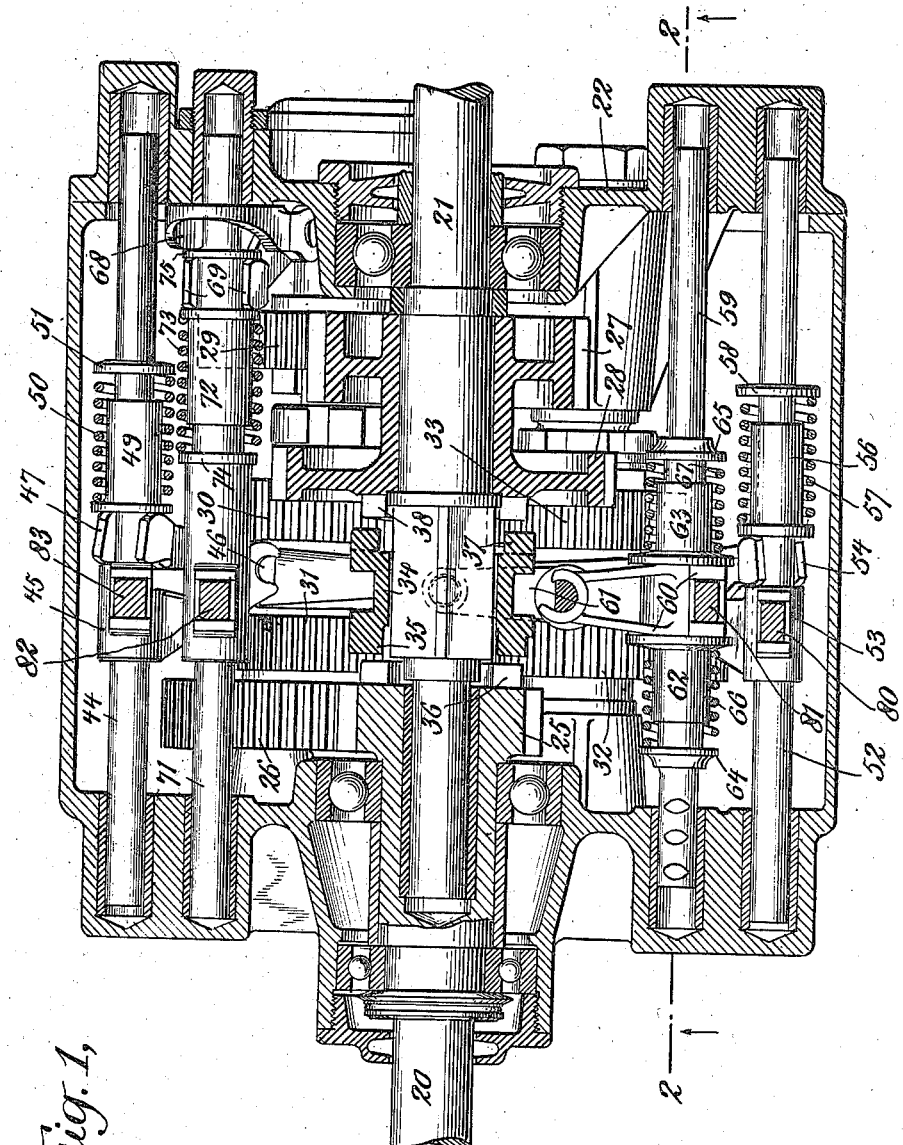
Figure 2:
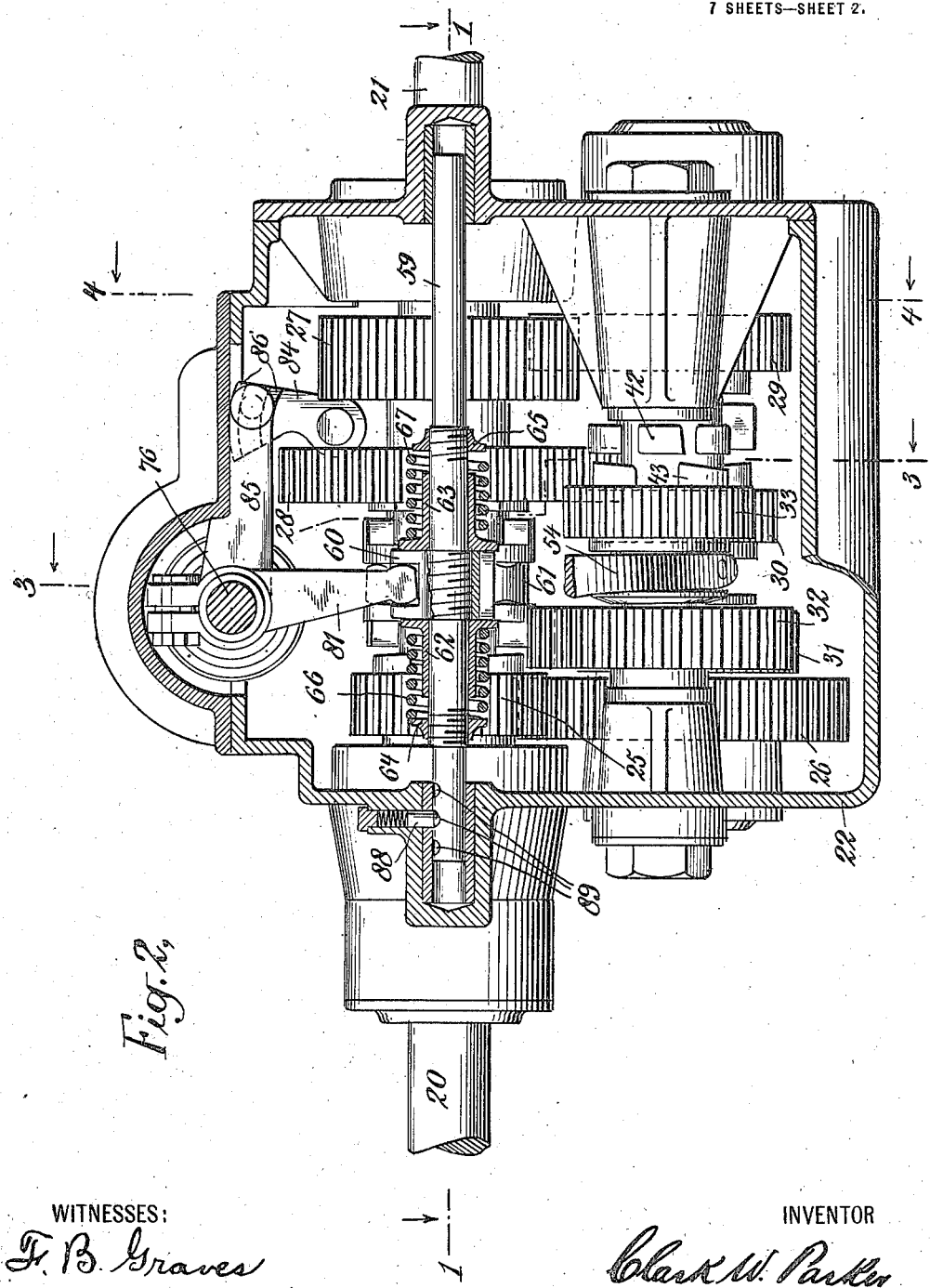
Figure 3:
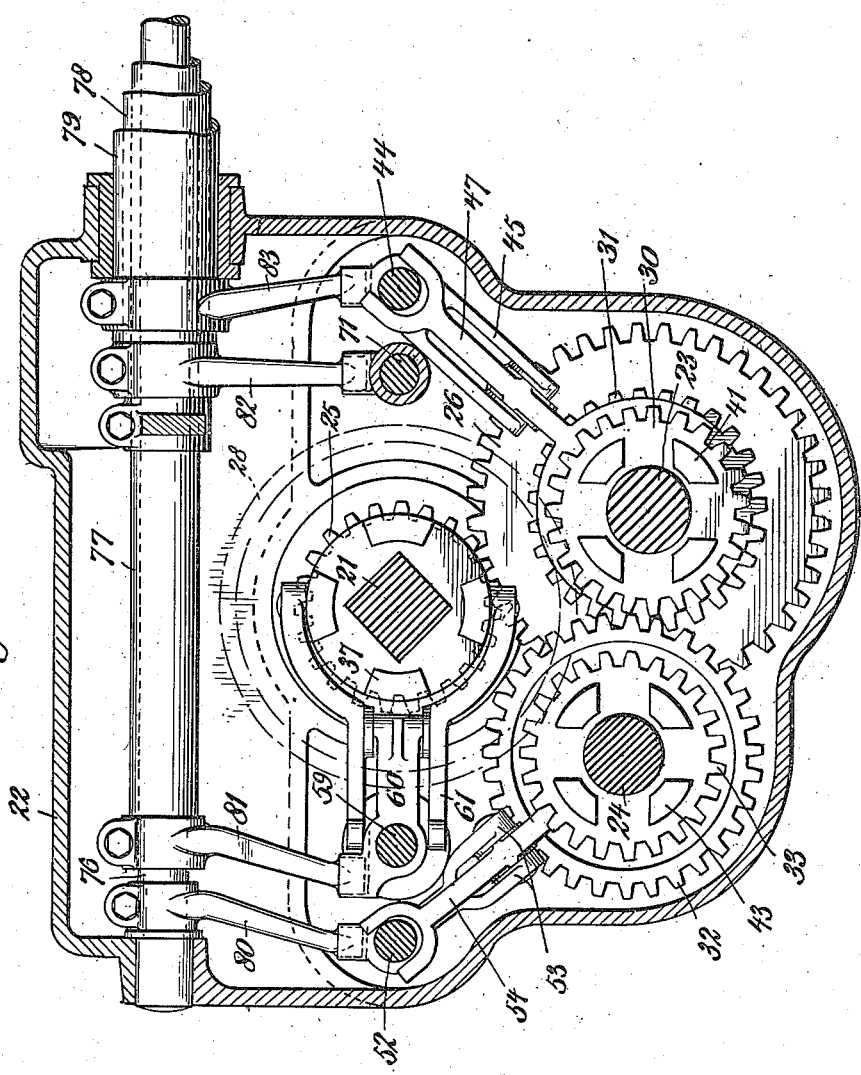
Figure 4:
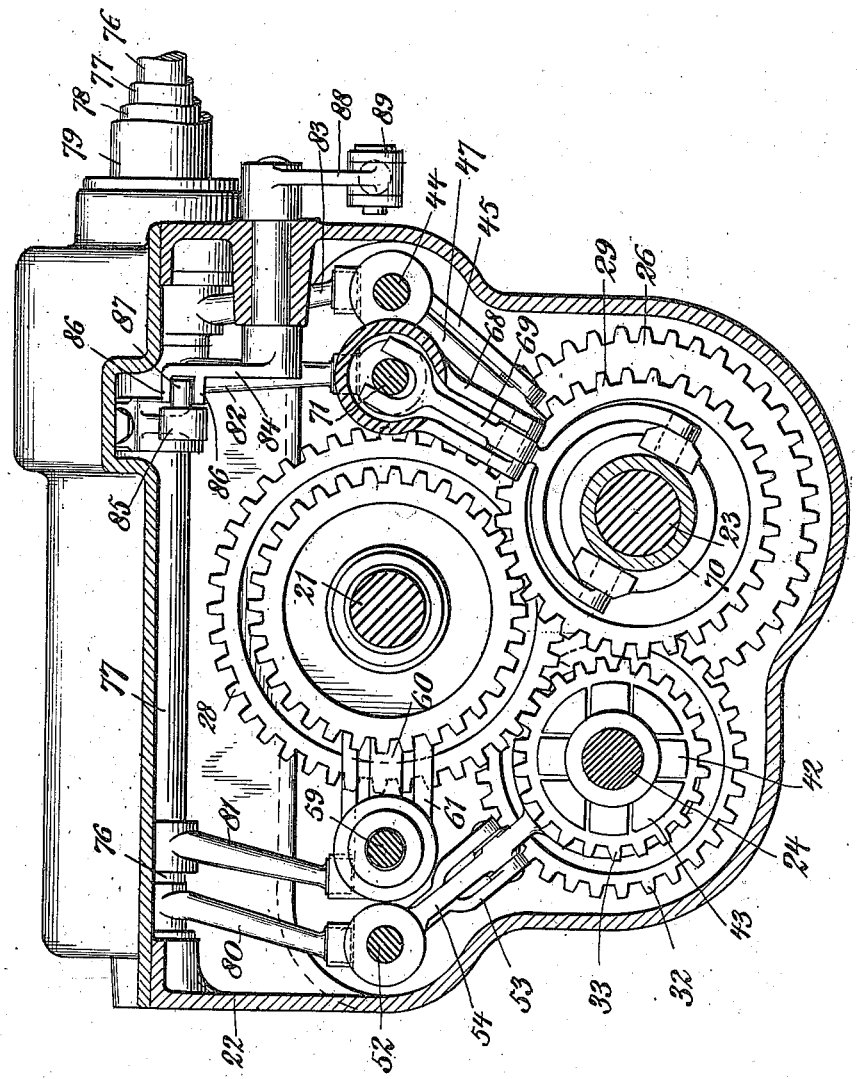
Figure 12:
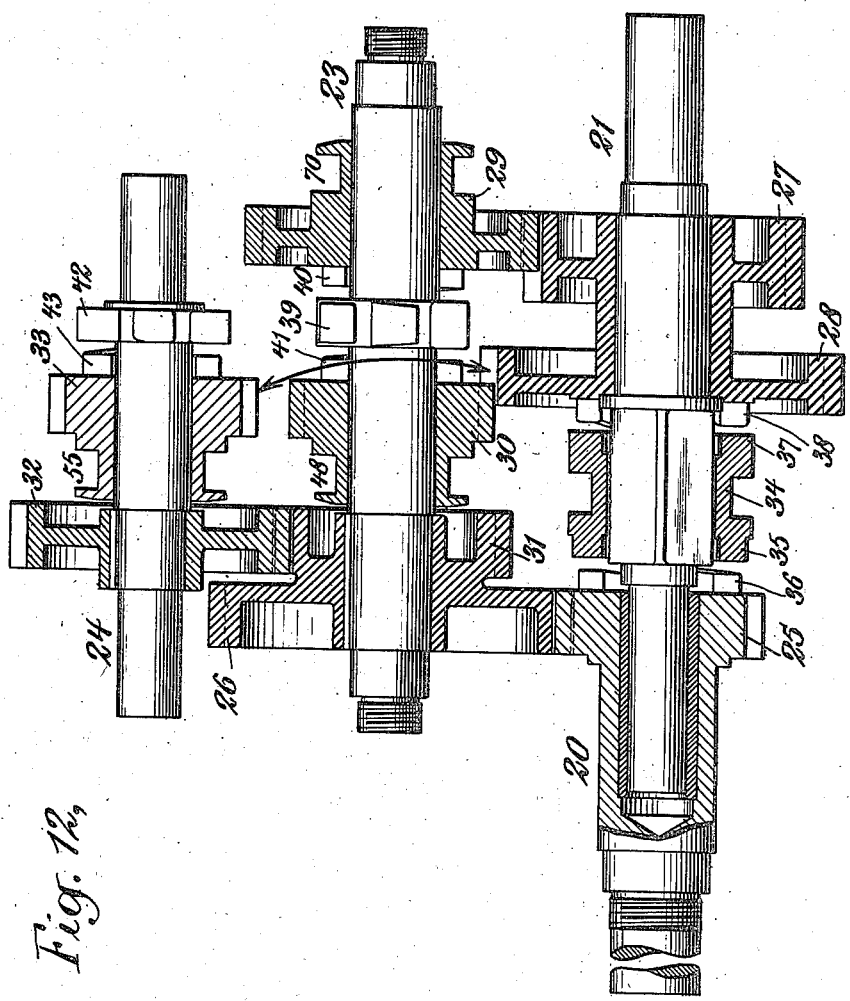

In the drawings: Figure 1 is a view in horizontal longitudinal section through a transmission gearing embodying my invention, the plane of section being indicated by the line 1—1 of Fig. 2. Fig. 2 is a view in vertical longitudinal section therethrough, the plane of section being indicated by the line 2—2 of Fig. 1. Fig. 3 is a view in transverse vertical section therethrough, substantially upon the plane of the line 3—3 of Fig. 2. Fig. 4 is a view in vertical transverse section therethrough upon the plane of the line 4—4 of Fig. 2. Fig. 5 is a fragmentary view outside of the casing, and in transverse section through the operating shafts for the clutches, showing particularly certain parts in connection with a locking means for the clutch operating mechanism. Figs. 6, 7, and 8 are detail views in side elevation of certain parts of the operating mechanism for the low speed clutch, the parts being shown in different positions in the several views. Fig. 9 is a detail view mainly in side elevation of certain parts of the operating mechanism for the main clutch. Fig. 10 is a detail view mainly in side elevation of parts of the mechanism for operating the second speed clutch. Fig. 11 is a detail view in side elevation of certain of the parts for operating the reverse clutch. Fig. 12 is a diagrammatic view in development of the gearing and clutches illustrating the relationship of the gearing. For the better understanding of such relationship the shafts are disposed with their axes in a single plane instead of being arranged in a triangular group, as in the actual structure illustrated in the other views.

The driving shaft 20 and the driven shaft 21 are arranged axially in line with each other, being mounted in suitable bearings in the casing 22. For convenience of construction the forward end of the driven shaft may be telescoped within the rear end of the drive shaft as shown. Mounted parallel with the driving and driven shafts is an intermediate shaft 23 and likewise a reversing shaft 24, both of the said shafts being also mounted to rotate in suitable bearings in the casing. The drive shaft 20 is provided with a pinion 25 which is secured fast thereto, or made as a part thereof, the teeth of the said pinion 25 being disposed in mesh with the teeth of a spur gear 26 which is secured to rotate with the intermediate shaft 23. Loosely mounted upon the driven shaft 21, but secured fast together, are two spur gears 27—28. The teeth of the spur gear 27 are arranged in mesh with the teeth of a complementary gear wheel 29 upon the intermediate shaft 23, while the teeth of the spur gear 28 are arranged in intermeshing relation with the teeth of a complementary gear wheel 30 also loosely mounted upon the intermediate shaft 23. The intermediate shaft 23 carries secured to it, in addition to the spur gear 26, another gear wheel 31, and the teeth of this gear wheel are arranged in mesh with a complementary gear wheel 32 secured fast upon the reversing shaft 24. Another gear wheel 33 is mounted loosely upon the reversing shaft 24, the teeth of this gear wheel being in intermeshing relation with the teeth of the spur gear 28 upon the driven shaft 21. In the diagrammatic view Fig. 12 the gear wheels 28 and 33 do not appear to be in mesh, but this is because the axes of the shafts are not shown in their correct relations. In the other figures, particularly in Fig. 4, the intermeshing relation is clearly and correctly shown. Mounted on the shaft 21, between the pinion 25 and the spur gear 28, is a collar 34. This collar is secured to rotate with the shaft but is mounted in sliding engagement therewith so that it may have a limited longitudinal movement with respect thereto. The said collar carries a plurality of teeth or jaws 35 such as constitute the moving element of a high speed or direct clutch, the relatively stationary element for which comprises complementary jaws or teeth 36 secured to the pinion 25.

The collar 34 likewise carries at the other end thereof a set of jaws or teeth 37 arranged for engagement with complementary teeth or jaws 38 carried by the spur gear wheel 28, the elements 37 and 38 constituting a clutch which is termed herein the indirect or driven shaft clutch.

Secured fast to, or made as a part integral with the intermediate shaft 23, is a set of clutch teeth 39, and the gear wheels 29 and 30 are each provided with a set of clutch teeth or jaws 40—41 for respective complementary engagement therewith. The clutch teeth 40 in combination with the teeth 39 are termed herein the intermediate or second speed clutch, while the teeth 41 in combination with the teeth 39 are termed herein the low or third speed clutch. The reversing shaft 24 is provided with a set of relatively stationary clutch teeth 42 secured fast thereto, or made as a part integral therewith, the gear wheel 33 upon the reversing shaft being provided with a set of clutch teeth 43 for complementary engagement with the clutch teeth 42. The two sets of clutch teeth 42 and 43 are termed herein the reversing clutch. The main clutch is operated in one direction to produce high speed and in the other direction to produce an intermediate speed or reverse drive in connection with the clutches on one of the intermediate shafts, by moving the collar 34 longitudinally upon the driven shaft, while the intermediate or second speed clutch, the low or third speed clutch, and the reversing clutch are each operated by moving the gear wheels 29—30 and 33 respectively along their shafts. I will now describe the means by which these longitudinal movements are brought about, and because of the greater simplicity of construction thereof, I will refer first of all to the clutch operating mechanism for the low speed clutch, the principal parts of which mechanism are shown in their various positions in Figs. 6, 7, and 8. This mechanism includes a shipping rod 44 mounted to slide longitudinally in the casing 22 in a path parallel with the axes of the shafts. Secured fast to this shipper rod is a bracket 45, the extended end of which constitutes a pivotal support for the trunnions 46 of a rocker arm 47. One end of the rocker arm 47 is forked and partially surrounds and engages a collar 48 with which the gear 30 is provided, while the other end embraces the shipper rod 44. Mounted loosely upon the shipper rod 44 is a thimble, plunger or sleeve 49, and a helical spring 50 surrounds the said sleeve and bears at one end against a shouldered portion thereof and at the other end against a stationary collar 51 upon the said shipper rod. The shipper rod, bracket and stationary collar 51 constitutes a carriage carrying the plunger or sleeve 49, the spring 50 and the rocker arm 47. When it is desired to connect the low speed clutch elements 41—39, the shipper rod 44 is moved to the right as viewed in Fig. 6. If the teeth 41 happen to come, just at the time the shipper rod is being moved, between the teeth 39, the clutch will immediately engage because in such movement of the shipper rod 44 the parts carried thereby including the bracket 45 and the arm 47, will be moved bodily over to the right. But if on the other hand, the clutch elements are not ready for such coengagement, the teeth 41 being out of line with the spaces between the teeth 39, then upon movement of the shipper rod to the right, corresponding movement of the gear wheel 39 and the clutch teeth 41 carried thereby, will be resisted. The lever 47 will then rock about its fulcrum 46 upon the bracket 45, the end of the lever 47 which surrounds the shipper rod being forced forward against the tension of the spring 50 which, in such movement of the rocking arm, will be compressed. Fig. 6 shows the parts in their normal inoperative or neutral positions, while Fig. 7 shows the parts in the positions they will assume when the shipper rod has been forced over to the right in an operative movement without any corresponding movement having been imparted to the gear wheel 30 and clutch teeth 41. In the relative rotation of the parts the clutch elements 39—41 will thereafter be brought into register, and at such time the spring 50 will immediately expand to rock the lever 47 in a reverse direction so as to throw the clutch element 41 into place. The parts are shown in this position in Fig. 8. Upon moving the shipper rod to the left to disengage the clutch elements it will be noted that the bracket forms a solid shoulder or abutment for the rocking lever 47 so that the clutch teeth 41 may be positively withdrawn from their engagement with the teeth 39. It will also be noted that in the normal condition of the parts the rocking lever 47 rests against the bracket under the influence of the spring 50, the thimble, plunger or sleeve 49 being in constant yielding engagement with the said lever.

The same construction is used in connection with the operating mechanism for the reverse clutch as will be seen by reference to Fig. 11. The mechanism includes a shipper rod 52 corresponding to the shipper rod 44 above described, a bracket 53 carried thereby corresponding to the bracket 45, a rocking lever 54 fulcrumed in the said bracket 53 and having an arm engaging a collar 55 of the gear wheel 33, a sleeve or thimble or plunger 56 upon the shipper rod 52, and a helical spring 57 surrounding the said sleeve or thimble or plunger and bearing at one end against an abutment thereof and at the other end against a stationary collar 58 upon the shipper rod 52.

The operating mechanism for the direct and indirect clutches is also similar thereto except that certain of the parts are in duplicate in order to permit of the operation of one or the other of the said clutches when the shipper rod therefor is moved in either direction. This mechanism which is shown in detail in Fig. 9, includes a shipping rod 59, a bracket 60 secured fast thereto, a rocking lever 61 fulcrumed in the said bracket, one end thereof being arranged to engage the collar 34 and the other end to embrace the shipper rod 59, two sleeves or thimbles or plungers 62—63 loosely mounted upon the shipper rod 59, two collars 64—65 secured fast upon the shipper rods, and two helical springs 66—67 surrounding the said thimbles or sleeves and disposed under tension between the collars 64—65 respectively and abutments of the sleeves 62—63 whereby the said sleeves are normally forced together. In this instance, as the rocking arm 61 is to move in either direction, the bracket is arranged to directly engage the sleeves to form a limiting stop therefor instead of to engage them through the intermediation of the rocking lever ends, as in the construction shown in Figs. 6, 7 and 8, and 11. The width of the bracket where it surrounds the shipper rod is just about equal to the width of the rocker arm at this point, as clearly appears in Fig. 9, therefore while the rocker arm is free to move in one direction or the other and in such movement to move the sleeve 62 or the sleeve 63 against the tension of either the spring 66 or the spring 67, the sleeve not so moved at the time will remain at rest against the bracket. In the construction shown the movement of the shipper rod to the left, as the parts are viewed in Fig. 9, will bring about the engagement of the high speed or direct clutch, while the movement to the right, as viewed in Fig. 9, will cause the disengagement of the direct or main clutch and the engagement of the indirect or driven shaft clutch, as will be well understood, and the same yielding connection is afforded in connection with the operation of either of the said clutches as has been described in connection with the low speed clutch mechanism illustrated in Figs. 6, 7, and 8. The clutch operating mechanism for the intermediate or second speed clutch and which is illustrated in Fig. 10, is of a somewhat different nature and this is for the reason that while simultaneous movements in the same direction must be imparted to the indirect and low speed clutches when it is desired to adjust the parts for low speed driving, and likewise simultaneous movements in the same direction must be applied to the main clutch and the reverse clutch when it is desired to adjust the parts for reverse driving, when adjusting the parts for the intermediate or second speed driving, the movement to be imparted to the second speed or intermediate clutch is in a direction opposite to that required to be simultaneously imparted to the main clutch. As it is convenient to move the shipping rods in the same direction the lever mechanism is employed in such a way as to reverse the movement of the shipping rod as imparted to the clutch. For this purpose (see particularly Fig. 10) the bracket 68 for the rocking lever is secured fast to the casing 22 instead of being carried by the shipper rod. This bracket forms the supporting element for a rocking lever 69, one end of which engages a collar 70 with which the gear wheel 29 is provided, while the other end embraces the shipper rod 71. A sleeve or thimble plunger 72 is loosely mounted upon the shipper rod 71, a helical spring 73 surrounding the said sleeve or thimble plunger and extending under tension between a stationary collar 74 upon the shipper rod and an abutment on the sleeve. The sleeve rests against the rocking lever 69, the rocking lever in turn resting in its normal position against a relatively stationary collar 75 upon the shipper rod. In this construction a movement to the right as viewed in Fig. 10, of the shipper rod 71, acts through the rocker arm 69 to move the gear wheel 29 and clutch teeth 40 carried thereby, to the left. If the clutch teeth do not come into proper register with the clutch teeth 39 at the time the shipping rod 71 is so moved, the spring 73 is compressed so that after the shipper rod 71 has completed its movement the energy thus stored in the spring 73 may be given up by completing the rocking movement of the lever 69 necessary to bring about the clutch engagement. As in the other cases the clutch elements may be positively withdrawn from engagement when the shipping rod is moved to the left because at such time the relatively stationary collar 75 is in direct engagement with the rocking lever 69 for thus purpose. The general principle included in this method of operation and that described in connection with the other mechanisms, is the same, the difference in the method of applying it being that in the present instance the lever is rocked to move the clutch elements and is held relatively stationary with respect to any such rocking movement when the spring yields as a result of movements applied to the shipping rod and not partaken of by the clutch element, while in the other constructions the lever remains relatively stationary so far as any rocking movement is concerned and the corresponding movements of the shipper rods and clutch elements, but rocks against the yielding action of the springs when movements of the shipper rod are not partaken of by the clutch elements.

It will be noted that the yielding connections between the shipping rods and the clutches, just described, permits the yielding of one clutch with respect to another when two or more are operated simultaneously, and the yielding of the clutch or clutches with respect to the operating and controlling lever mechanism therefor so as to permit complete throw of the latter before the clutch has been actually engaged. The springs operating the fork levers operate to hold the ends of the levers, which are contiguous to the shifter rods, against abutments on the shipper rods 52, the abutments being designated 52ª in Fig. 11, 75 in Fig. 10, and in Fig. 9, the bracket 60 constitutes an abutment which prevents one spring 66 or 67 from extending when the other spring is being compressed by the lever 61.

The several shipping rods are moved longitudinally in their clutch operating movements, by any suitable mechanism, and as a convenient means therefor I have shown the gearing as provided with a plurality of nested shafts 76—77—78—79, the same being connected by means of arms 80—81—82—83 with the shipping rods 52—59—71—44 respectively. The nested shafts 76—77—78—79 are operated by any suitable lever controlling mechanism, for an example of which I refer to U. S. Letters Patent No. 983,249 which issued to me on the 31st day of January, 1911. For purposes of the present specification it is merely necessary to point out that a movement of rotation in one direction of the shaft 77 which carries the arm 81 will, through its engagement with the shipping rod 59, operate the high speed or direct clutch, and a similar movement of rotation in the opposite direction thereof will operate the main clutch to produce direct drive. A similar movement in the same direction as that last mentioned of the other shafts will, through the respective engagement of their operating arms with the various shipper rods, bring about the operation of the intermediate, the low speed, and the reversing shafts.

When the high speed clutch alone is operated the driving and driven shafts are directly connected together and high speed forward driving, i. e., direct driving, results. For intermediate or second speed forward, the indirect or driven shaft clutch, and the intermediate or second speed clutch are simultaneously operated. The shafts 77 and 78 will be moved simultaneously for this purpose, the two shipping rods 59—71 being moved together in the same direction. This will bring about the movement of the collar 34 with its clutch teeth 39 to the right, but the gear wheel 29 with its clutch teeth 40 will be moved to the left owing to the reversal of movement derived from the employment of the rocking lever 69. By referring to Fig. 12 the parts through which the driving movements are transmitted will be found to be as follows:—from the drive shaft 20 and pinion 25 to the spur gear 26, thence through the shaft 23 and the intermediate or low speed clutch 39—40 to the gear wheel 29, thence through the gear wheel 29 to the complementary gear wheel 27 upon the driven shaft 21, and thence through the indirect or driven shaft clutch 37—38 to the said driven shaft. Now assuming the parts back to their normal inoperative position, a third speed forward driving connection is obtained by a simultaneous movement of rotation imparted to the shafts 77—79, simultaneous movements in the same direction being thereby imparted to their respective shipper rods 59 and 44. This movement which is a movement of the parts to the left as shown in Fig. 12, will connect the clutches 37 and 38 of the main clutch and the clutches 39, 41 and the driving connection may be traced as follows:—from the drive shaft 20 and pinion 25 to the spur gear 26, thence through the shaft 23 to the low or third speed clutch 39—41, thence through the gear wheel 30 to the complementary gear wheel 28 upon the driven shaft, and thence through the indirect or driven shaft clutch 37—38 to the driven shaft 21. Again assuming the parts back to their normal inoperative positions, reverse driving connection is effected by a simultaneous operation in the same direction of the shafts 77—76, and by which corresponding movements are imparted to the shipper rods 59 and 52 to the right as viewed in the drawings. The result is a coengagement of the indirect or driven shaft clutch 37—38 and the reversing clutch 42—43. The driving connection may now be traced in Fig. 12 as follows:—commencing from the drive shaft 20 and the pinion 25 to the spur gear 26 upon the shaft 23, thence through the gear wheel 31 to the gear wheel 32 upon the reversing shaft, thence through the reversing clutch 42—43 to the gear wheel 33 upon the reversing shaft, thence to the gear wheel 28 upon the driven shaft, (recollecting that the gear wheels 33 and 28 are actually in mesh as above stated and as appears in Fig. 4 though not so shown in Fig. 12), and thence through the indirect or driven shaft clutch 37—38 to the driven shaft 21.

While for convenience in construction I have arranged that the gear wheels shall in certain instances, slide upon their shafts, they never move sufficiently to bring their teeth out of mesh with the teeth of any gears with which they are arranged at any time to intermesh.

For the purpose of locking the parts against movement except when they are released for that specific purpose, I have provided a locking quadrant 84 for coengagement with an arm 85 upon the shaft 77 which shaft it will be remembered is the shaft in operative engagement with the shipper rod 59 for the direct and indirect clutches. The quadrant 84 is provided with curved walls 86 arranged to receive a stud 87 upon the arm 85. When the shaft 77 is in its neutral position this stud will be between the walls as shown in Figs. 4 and 5, and movement of rotation of the shaft will be prevented. To release this arm it will be necessary to move the quadrant angularly about its axis, and an operating arm 88 connected by means of a link 89 with a pedal, manual lever, or analogous device, is provided for this purpose. After the quadrants have been moved a sufficient distance to release the arm 85, the shaft may be moved in one direction or the other to operate the clutches. When this has been accomplished the quadrant may be returned to its normal rest position, and in such case it will again hold the arm, this time against a return movement to the neutral position. If the arm 85 has been moved in one direction the stud thereof will rest upon the outside of the outer wall, while if it is moved in the other direction it will rest against the opposite side of the inner wall, all as will be well understood by reference to the drawings.

As the movement of the shaft 77 is necessary whenever any of the other shafts are moved, or, in other words, in every operation of the clutch controlling mechanism, either the main clutch is connected to produce direct drive or is operated in connection with other clutches. Hence the locking of this part of the shaft accomplishes the locking of all of the clutch mechanism.

The various shipper rods may be provided with the usual impositive lock to temporarily retain them in their adjusted position, one of such impositive locking means being shown in Fig. 2 in the form of a spring pin 88 arranged for engagement with notches 89 in the shipper rod 59.

It will be noted that the foregoing mechanism is highly condensed in form, the shafts are extremely short permitting the bearings to be close together by which spring is avoided even though the shafts be made quite light in weight. Furthermore, in achieving this condensed structure I have still retained the benefits of yielding connections between the shipper rods and the clutch elements operated thereby. By this arrangement I have saved the room taken up thereby, in such a construction as is illustrated in U. S. Letters Patent No. 982,856 which were granted to me on the 31st day of January, 1911. Indeed not only is this yielding clutch feature retained, but it is improved and the value thereof enhanced in the present structure because the springs are so located with respect to the shipper rods as to give a maximum of efficiency as yielding means while producing a minimum of side strain upon the working parts.

What I claim is:

1. In a transmission gearing, driving and driven toothed power-transmitting members, one being shiftable for carrying the teeth thereof into and out of interlocking engagement with the teeth of the other, and means for shifting the shiftable member including a rocking operating arm, a carriage actuated in reverse directions by said arm, a lever pivoted to the carriage and connected to the shiftable member, said carriage being formed with an abutment for the lever for limiting the pivotal movement thereof in one direction, the lever being normally engaged with said abutment, and a spring carried by the carriage and arranged to normally hold the lever against the abutment and to resist pivotal movement of the lever, substantially as and for the purpose described.

2. In a transmission gearing, driving and driven toothed power-transmitting members, one being shiftable for carrying the teeth thereof into and out of interlocking engagement with the teeth of the other, and means for shifting the shiftable member including an operating arm movable in reverse directions, a carriage actuated in reverse directions by said arm, a lever pivoted to the carriage and connected to the shiftable member, a plunger carried by the carriage and engaging the lever, and a spring acting on the plunger and arranged to resist movement of the plunger by the lever, substantially as and for the purpose specified.

3. In a transmission gearing, driving and driven toothed power-transmitting members, one being shiftable for carrying the teeth thereof into and out of interlocking engagement with the teeth of the other, and means for shifting the shiftable members including a movable operating arm a carriage actuated in reverse directions by said arm, a lever pivoted to the carriage and connected to the shiftable member, the carriage being formed with an abutment for the lever for limiting the movement thereof in one direction the lever being normally engaged with said abutment, a plunger supported by the carriage and arranged to engage the lever, and a spring acting on the plunger to hold the lever against the abutment and resist pivotal movement of the lever, substantially as and for the purpose set forth.

4. In a transmission gearing, three toothed power-transmitting members, one being interposed between the others and shiftable in opposite directions for carrying the teeth thereof into and out of interlocking engagement with the teeth of the other power-transmitting members, and means for shifting the shiftable member including a movable operating arm, a carriage actuated in reverse directions by said arm, a lever pivoted to the carriage and connected to the shiftable member, and springs carried by the carriage and acting on the lever in opposite directions for yieldingly resisting pivotal movement of the lever in opposite directions, substantially as and for the purpose described.

5. In a transmission gearing, three toothed power-transmitting members, one being interposed between the others and shiftable in opposite directions for carrying the teeth thereof into and out of interlocking engagement with the teeth of the other power-transmitting members, and means for shifting the shiftable member including a movable operating arm, a carriage actuated in reverse directions by said arm, a lever pivoted to the carriage and connected to the shiftable member, springs carried by the carriage and acting on the lever in opposite directions for yieldingly resisting pivotal movement of the lever in opposite directions, and stops fixed relatively to the carriage for restraining the movement of the springs toward each other, substantially as and for the purpose specified.

6. The combination of a pair of toothed power-transmitting members, one being shiftable into and out of interlocking engagement with the other, a shipper rod, a lever pivoted to the shipper rod and being connected to the shiftable member, and a spring carried by the shipper rod and acting on the lever to normally resist pivotal movement of the lever, substantially as and for the purpose set forth.

7. Clutch operating mechanism including a shipper rod, a bracket carried thereby, a rocking lever fulcrumed upon the said bracket, a clutch element actuated by the said lever, and a yielding spring between the said shipper rod and the said lever.

8. Clutch operating mechanism including a shipper rod, a bracket carried thereby, a rocking lever fulcrumed upon the said bracket, a clutch element actuated by the said lever, a yielding spring for permitting movement of the said lever with respect to the shipper rod, in one direction, and a stop for limiting the movement thereof in the other direction.

9. Clutch operating mechanism including a shipping rod, a bracket carried thereby, a rocking lever fulcrumed intermediate its ends upon the said bracket, a clutch element actuated by the lever, at one end thereof, a yielding spring upon the said shipper rod for engagement with the other end of the lever, and an abutment stationary with respect to the said shipper rod, for limiting the movement of the lever in the direction in which it is pressed by the said spring.

10. The combination of three toothed power-transmitting members, one being arranged between the others and shiftable axially in opposite directions from a neutral position to carry the teeth thereof into and out of interlocking engagement with the teeth of the other members, a shipper rod, a lever pivoted to the shipper rod, and connected to the shiftable member, and springs carried by the shipper rod and acting on the lever in opposite directions, substantially as and for the purpose described.

CLARK W. PARKER.

Witnesses:
F. B. GRAVES,
LYMAN S. ANDREWS, Jr.